United States Patent [19]

Saito

[11] Patent Number: 4,978,975

[45] Date of Patent: Dec. 18, 1990

[54] LASER SCANNING APPARATUS WITH DEFLECTOR AND RECEIVER IN AN OPTICALLY CONJUGATE RELATIONSHIP

[75] Inventor: Hiroshi Saito, Kawasaki, Japan

[73] Assignee: Canon Kabushiki Kaisha, Japan

[21] Appl. No.: 269,379

[22] Filed: Nov. 10, 1988

[30] Foreign Application Priority Data

Nov. 13, 1987 [JP] Japan ............................ 62-286819

[51] Int. Cl.5 ...................... G01D 15/14; G02B 26/08

[52] U.S. Cl. .................................... 346/108; 350/6.8

[58] Field of Search ................ 346/108, 107 R, 76 L, 346/160; 350/6.8, 6.5, 6.7

[56] References Cited

U.S. PATENT DOCUMENTS 4,447,112 5/1984 Matsuoko ............................ 350/6.5

FOREIGN PATENT DOCUMENTS 61-13759 1/1986 Japan .

62-75612 4/1987 Japan .

*Primary Examiner*—Mark J. Reinhart

[57] ABSTRACT

A laser recording apparatus comprises laser generating means generating a laser beam, deflecting means for deflecting the laser beam from the laser generating means to apply the laser beam to the surface of a recording medium, and light receiving means for receiving the laser beam deflected by the deflecting means. The light receiving means includes a reflecting member for reflecting the deflected laser beam, a condensing member for condensing the laser beam reflected by the reflecting member, and a light receiving member for receiving the laser beam condensed by the condensing member. The reflecting member and the light receiving member are in optically substantially conjugate relationship with the condensing member in a cross-section perpendicular to a plane in which the laser beam is deflected by the deflecting means. The optical path from the reflecting member to the condensing member is shorter than the imaginary optical path from the reflecting member to the surface of the recording medium.

11 Claims, 7 Drawing Sheets

MAIN SCANNING PLANE

AUXILIARY SCANNING PLANE

MAIN SCANNING PLANE

AUXILIARY SCANNING PLANE

LASER SCANNING APPARATUS WITH DEFLECTOR AND RECEIVER IN AN OPTICALLY CONJUGATE RELATIONSHIP

BACKGROUND OF THE INVENTION

1. Field of the Invention

This invention relates to a laser recording apparatus capable of reproducing image information such as characters and figures from a computer, an original reading apparatus, a word processor or the like at a high speed, and more particularly to a laser recording apparatus for effecting recording of high quality at high speed by deflecting and modulation-controlling a laser beam by image information such as figures and characters from a computer, an original reading apparatus, a word processor or the like.

2. Related Background Art

In a laser recording apparatus such as a laser beam printer, a laser beam is generated by a semiconductor laser or the like to form record images on a photosensitive member which is a recording medium, and the emission timing of this laser beam is taken by emitting said beam to the reflecting surface of a rotating polygon mirror provided at the front stage on the emission side of the semiconductor laser, and detecting a beam at a side edge portion of the laser beam deflected and scanned toward the photosensitive member. For the detection of this beam, the side edge portion of said beam is applied to a return mirror for a horizontal synchronizing signal which reflects the beam, and the beam from this return mirror for a horizontal synchronizing signal is directed to a horizontal synchronizing signal detecting element to thereby take the timing.

FIG. 1 of the accompanying drawings shows a laser recording apparatus disclosed in Japanese Laid-Open Patent Publication No. 61-13759.

In FIG. 1, a light beam emitted from a semiconductor laser 101 passes through a collimator lens 102*a* and is collimated thereby, and is reflected by a polygon mirror 103 which is a deflector as scanning means. The polygon mirror 103 is rotated at a predetermined speed in the direction of arrow by a motor, not shown. With the rotation of the polygon mirror 103, the reflected light beam is scanned, and a passes through an $f\theta$ lens 104 as a scanning lens and is imaged on an electrophotographic photosensitive drum 105 which is a recording medium, and is scanned in the direction of arrow 105*a*. On the drum 105, exposure to a light beam modulated correspondingly to information to be recorded is started from a point 105*b* by means which will be described later.

That is, the image forming area of the photosensitive drum 105 is scanned by this light beam. Designated by 102*b* and 102*c* are cylindrical lenses disposed forwardly and rearwardly of the polygon mirror 103. The cylindrical lenses 102*b* and 102*c* together constitute a tilt compensating optical system for making the scanning locus of light beam constant on the drum 105 even if the rotary shaft of the polygon mirror 103 is inclined.

Before the light beam scanned by the polygon mirror 103 and passed through the lens 104 arrives at the drum exposure starting point 105*b*, the light beam is reflected by a mirror 106 and moves in the direction of arrow 106*a*. Thus this light beam scans the entrance end surface 108*b* of an optical fiber 108*a* through the slit of a mask 107 and an auxiliary lens 115 having a condensing property. When the light beam enters the entrance end surface 108*b*, the light thereof is transmitted by the optical fiber 108*a*, and a signal is formed by a detecting element 108 such as a PIN photodiode or CdS (cadmium sulfide). The signal is amplified by an amplifier 109 and the point of time at which this amplified signal has risen to a predetermined level is detected by a detector 110. In a predetermined time after this point of time, a timer 111 operates a memory 112 and causes the memory 112 to transmit an information signal to be recorded to a driving circuit 114. (An information signal to be recorded is imparted in advance to the memory 112 from a signal source 113 such as a computer, an original reading apparatus or a word processor and is stored therein.) The driving circuit 114 drives the semiconductor laser 101 in response to said recorded information signal and thus, the semiconductor laser 101 emits an ON-OFF-modulated laser beam correspondingly to said signal.

FIGS. 2A and 2B are enlarged views of the horizontal synchronizing signal detecting portion of the above-described prior-art laser recording apparatus, and FIG. 2A represents the state of the light beam on the optical path in the main scanning plane (a plane parallel to the deflecting surface), and FIG. 2B represents the state of the light beam in a direction orthogonal thereto, i.e., the auxiliary scanning direction. The light beam for a horizontal synchronizing signal returned by the return mirror 106 passes through a slit 107 located substantially at the same optical path length as the drum surface. This slit 107 is used to increase the sensitivity of timing of the beam in the main scanning direction. The light passed through this slit 107 passes through a condensing lens 115 and arrives at the entrance end surface of an optical fiber 108. A photodetector element is provided on the other end surface of the optical fiber, and photoelectric conversion is effected thereon. The return mirror 106 and the entrance end surface of the optical fiber are in optically conjugate relationship with the condensing lens 115 so that even if the reflecting mirror 106 is more or less inclined in the auxiliary scanning direction as indicated, for example, by broken line in FIG. 2B, the light beam for a horizontal synchronizing signal will not deviate from the entrance end surface of the optical fiber to make photodetection impossible. However, the optical path length from the mirror 106 to the condensing lens 115 need be substantially the same as the ideal optical path length to the photosensitive drum, and this has led to the disadvantage that it is difficult to draw around the optical path and therefore the entire optical scanning apparatus becomes bulky.

Also, as is disclosed in Japanese Laid-Open Patent Publication No. 62-175612, a method of shortening the distance to the light receiving surface is proposed, and a schematic view of the detecting portion thereof is shown in FIG. 3 of the accompanying drawings. The light beam for a horizontal synchronizing signal returned by the return mirror 106 passes through a cylindrical lens 38 having a power in the main scanning direction and having no power in the auxiliary scanning direction. Further, the light beam passed through this lens is condensed by a cylindrical lens 39 having no power in the main scanning direction and having a power in the auxiliary scanning direction and arrives at a photoelectric converting element 40. Here, the cylindrical lens 38 has the function of shortening the imaging position of the light beam for a horizontal synchronizing signal, and the cylindrical lens 39 has the function of making it difficult for the light beam to deviate from the photoelectric converting element relative to the movement of the return mirror 37 in the auxiliary scanning direction and the function of imaging the light beam in the auxiliary scanning direction. In this system, however, the light receiving surface of the photoelectric converting element is placed at the point whereat the laser beam is condensed by the condensing lens, that is, the mirror 106 and the light receiving surface of the photoelectric converting element 40 are not in optically conjugate relationship with the condensing lens. This leads to the problem that due to the inclination of the reflecting mirror, photodetection becomes difficult.

SUMMARY OF THE INVENTION

According to the present invention, there is provided a laser recording apparatus in which a return mirror for detecting a horizontal synchronizing signal and a detector for detecting the horizontal synchronizing signal are disposed optically conjugately with a condensing lens for detecting the horizontal synchronizing signal in the auxiliary scanning plane and the position of the condensing lens for detecting the horizontal synchronizing signal is set at a position shorter than a position corresponding to a photosensitive member which is a recording medium, whereby, in spite of being compact and simple, a high accuracy can be realized in the detection of the horizontal synchronizing signal and, stable and strong constitution against a variation with time can be accomplished.

DESCRIPTION OF THE PREFERRED EMBODIMENTS

Figure 1:
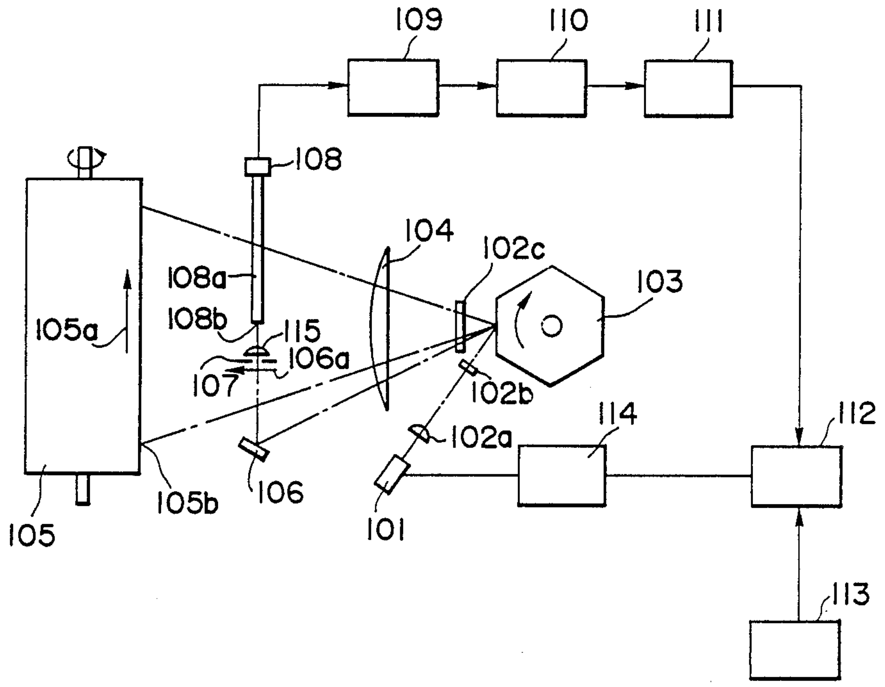
F I G. 1 PRIOR ART
FIG. 1 illustrates a laser recording apparatus according to the prior art.
Figure 2A:
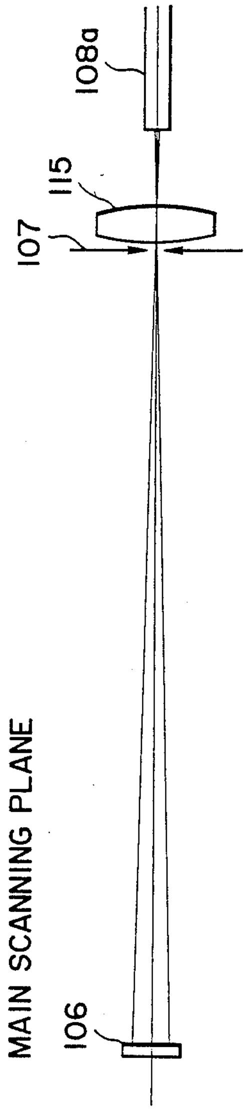
FIG. 2A PRIOR ART
FIGS. 2A to 3B show horizontal synchronizing signal detecting portions according to the prior art.
Figure 2B:
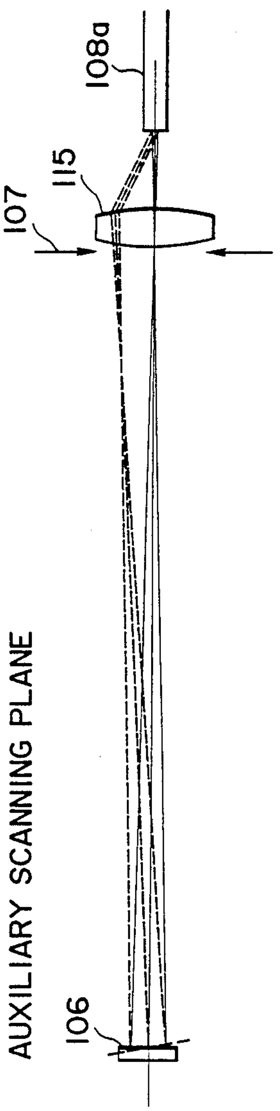
FIG. 2B PRIOR ART
Figure 3A:
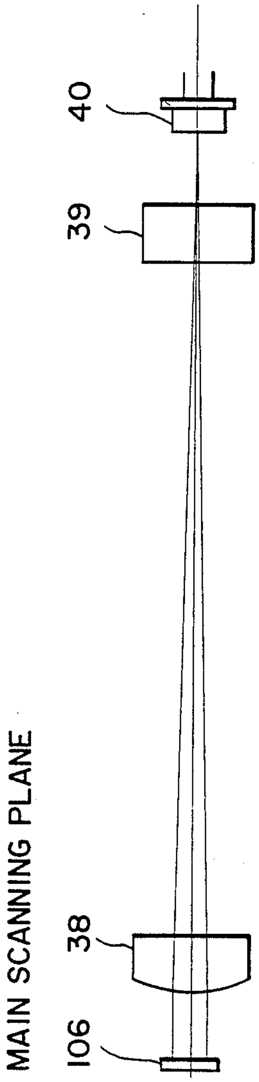
Figure 3B:
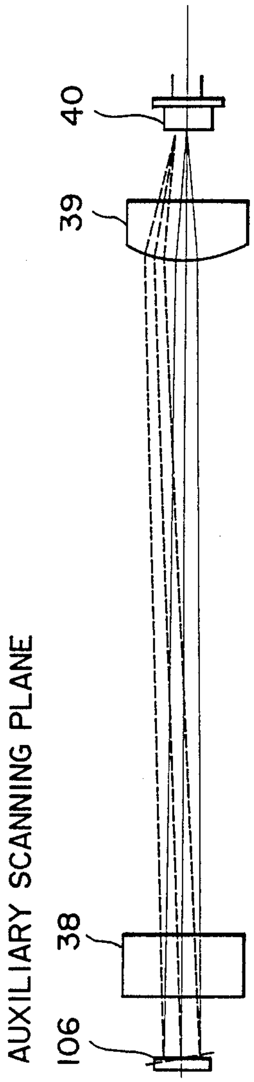
Figure 4:
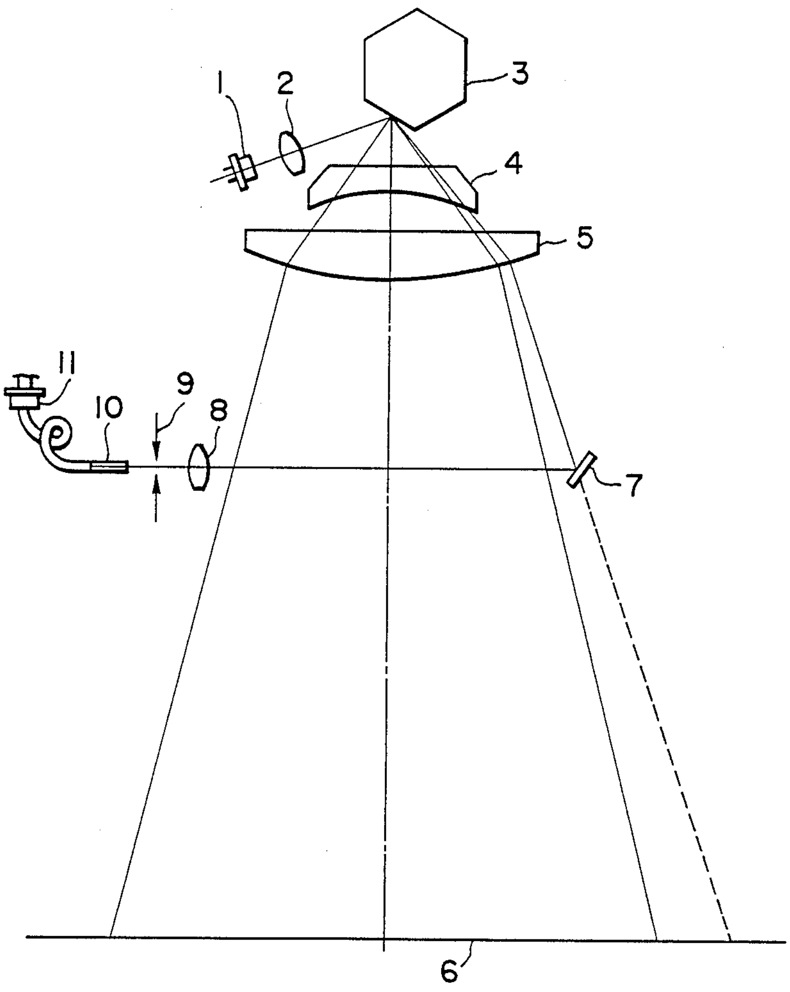
FIG. 4 shows the whole of the optical scanning system of the laser recording apparatus of the present invention.
Figure 5A:
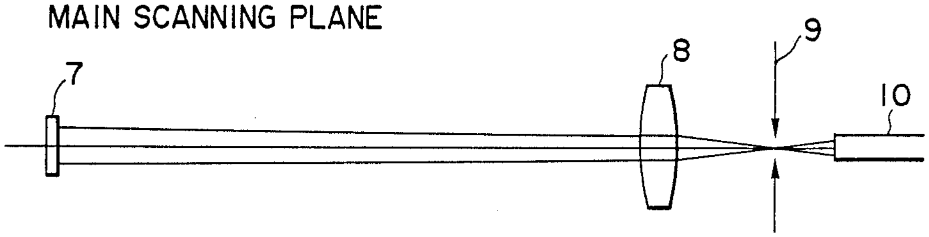
FIGS. 5A and 5B show horizontal synchronizing signal detecting portions of the present invention.
Figure 5B:
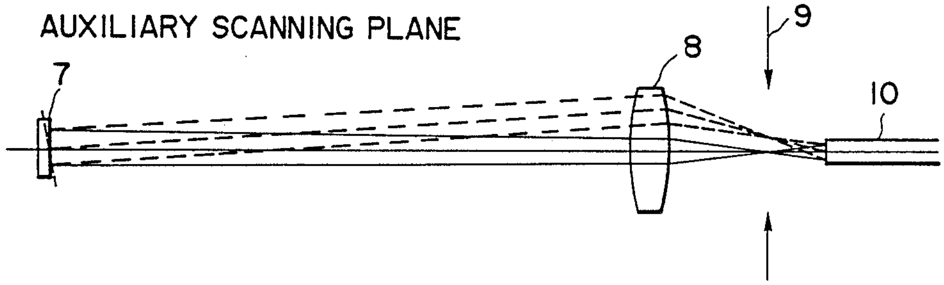

FIGS. 4 to 5B illustrate an embodiment of the present invention, and FIG. 4 shows the whole of the optical scanning system of the laser recording apparatus. In FIG. 4, a light beam emitted from a semiconductor laser 1 which is a light source is substantially collimated by a collimator lens 2, and is rotated and deflected by a rotational polygon mirror 3. The deflected light beam is condensed by fθ lenses 4 and 5, is imaged on a photosensitive drum 6 which is a recording medium, and is linearly scanned. Also, in order to obtain the timing for writing, a part of the deflected light is used as a light beam for a horizontal synchronizing signal.

The light beam for the horizontal synchronizing signal passes through a condensing lens 8 which comprises a single lens having a spherical surface via a return mirror 7, and further passes through a narrow slit in the main scanning direction 9 (the direction in which the laser beam is deflected by the deflector) and enters the end surface of an optical fiber 10.

A photoelectric converting element 11 is connected to the other end surface of the optical fiber, and the optical fiber is used to make it difficult for the photoelectric converting element 11 to receive electrical noise. The state of the detecting system 7, 8, 9, 10 and of the light beam is shown in FIGS. 5A and 5B. FIGS. 5A and 5B illustrate a horizontal synchronizing signal detecting portion. FIG. 5A shows the state of the light beam in the main scanning plane (the plane parallel to the deflecting surface), and FIG. 5B shows the state of the light beam in the auxiliary scanning direction in a plane orthogonal thereto (a cross-section perpendicular to the deflecting surface).

In FIG. 5A, the light beam for the horizontal synchronizing signal returned by the return mirror 7 is condensed by the fθ lenses 4 and 5, and will be imaged at a position in the optical path length corresponding to the photosensitive drum if the condensing lens is absent. Since the condensing lens 8 is at a position nearer to the return mirror 7 than to the imaged position of the laser beam by the fθ lenses 4 and 5, the light beam for the horizontal synchronizing signal is subjected to the condensing action of the lens 8 and is imaged at a position shorter than the optical path length corresponding to the photosensitive drum. Near this position at which the laser beam is imaged, there is placed a slit 9 narrow in the main scanning direction and having a certain width in the auxiliary scanning direction. At this position, the light beam is stopped to its minimum and therefore, by placing there a slit of a shape narrow in the main scanning direction, the horizontal synchronizing signal can be detected with good sensitivity. The light beam for the horizontal synchronizing signal passed through the slit 9 enters one end surface of the optical fiber 10. A photoelectric converting element is attached to the other end surface of the optical fiber. The position of the entrance end surface of the optical fiber 10 for the light beam is set in optically conjugate relationship with the return mirror 7 and the lens 8 in the auxiliary scanning plane, and even if the return mirror is more or less inclined as indicated by broken line in FIG. 5B, the light beam becomes such as indicated by broken lines, and the light beam for photodetection enters the same position relative to the end surface of the optical fiber. Accordingly, even if the return mirror 7 is inclined, the photodetection for synchronization will never become impossible.

As described above, the positions of the return mirror for detecting the horizontal synchronizing signal and the light receiving portion for detecting the horizontal synchronizing signal are made into optically conjugate relationship with the condensing lens for detecting the horizontal synchronizing signal in the auxiliary scanning plane and the condensing lens is set at the side nearer to the return mirror than to the imaged position of the light beam for detecting the horizontal synchronizing signal when the condensing lens is absent, that is, the optical path from the return mirror to the condensing lens is made shorter than the imaginary optical path (indicated by dotted line in FIG. 4) from the return mirror to the surface of the recording medium, whereby the full length of the optical path for detecting the horizontal synchronizing signal becomes shorter and simpler detection of the horizontal synchronizing signal can be accomplished, and stability of detection is good even for the inclination of the return mirror resulting from the vibration or the variation with time thereof. Further, by placing the slit at a position rearward of the condensing lens whereat the light beam becomes minimum, there can be obtained a horizontal synchronizing signal which is good in rising and good in sensitivity.

Also, it is possible to accomplish detection by a single condensing lens, and this leads to an economically advantageous construction.

Also, by changing the location of the condensing lens and the imaging magnification or the like of the condensing lens variously while keeping the positions of the return mirror and the light receiving portion in optically conjugate relationship with the condensing lens, it is possible to freely set the optical path length for detecting the horizontal synchronizing signal. Accordingly, it is possible to set a photodetector for detecting the horizontal synchronizing signal at a suitable position in conformity with the size of the unit of the scanning optical system of the laser recording apparatus.

In the above-described embodiment, the slit 9 is used to improve the detection sensitivity for the horizontal synchronizing signal, but if the detection sensitivity of the detecting means does not come into question, the slit may be absent.

Figure 6A:
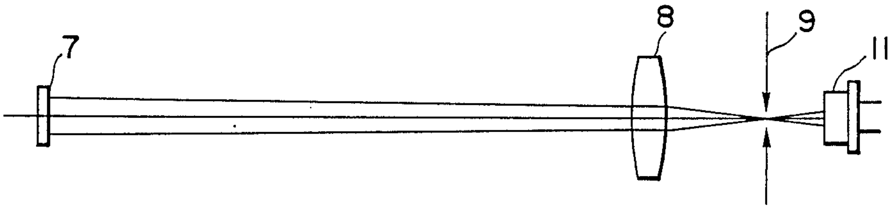
FIGS. 6A to 7B show further horizontal synchronizing signal detecting portions of the present invention.
Figure 6B:
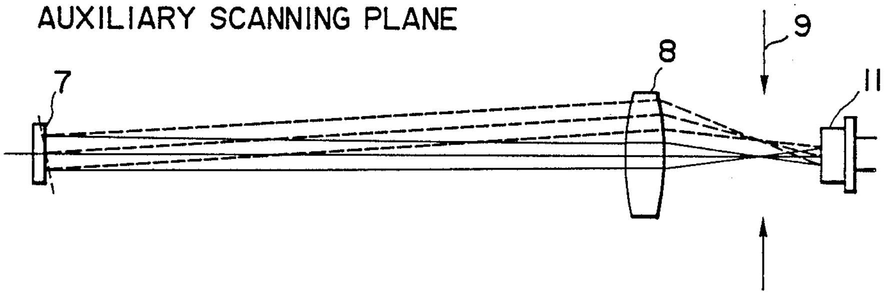

Although in the above-described embodiment, there has been shown an example in which the return mirror and the end surface of the optical fiber are in optically conjugate relationship with the condensing lens, not the optical fiber but a photoelectric converting element 11 may be directly used as shown FIGS. 6A and 6B and the return mirror 7 and the light receiving surface of the photoelectric converting element 11 may be made conjugate with the condensing lens 8 to obtain a similar effect.

In the above-described embodiment, the return mirror and the entrance end surface of the detecting means (the end surface of the optical fiber or the light receiving surface of the photoelectric converting element) are in optically conjugate relationship with the condensing lens both in the main scanning plane and in the auxiliary scanning plane, but they need not always be in conjugate relationship in the main scanning plane.

What comes into question in the main scanning plane is the detection sensitivity for the horizontal synchronizing signal. It is desirable that the entrance end surface of the detecting means be near the point of condensation of the laser beam in the main scanning plane. Particularly, if the slit is disposed at the point of condensation of the laser beam in the main scanning plane, a horizontal synchronizing signal of good sensitivity can be obtained.

What comes into question in the auxiliary scanning plane is the problem that due to the inclination of the return mirror resulting from the vibration or the variation with time of the return mirror, the light beam for the horizontal synchronizing signal deviates from the entrance end surface of the detecting means. Accordingly, in the auxiliary scanning plane, the return mirror and the entrance end surface of the detecting means must be in optically conjugate relationship with the condensing lens. Of course, slight deviation from that relationship would pose no problem. An example of it is shown in FIGS. 7A and 7B.

Figure 7A:
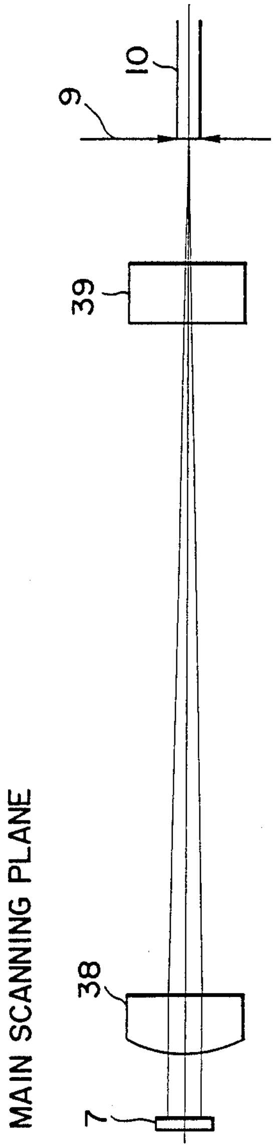
Figure 7B:
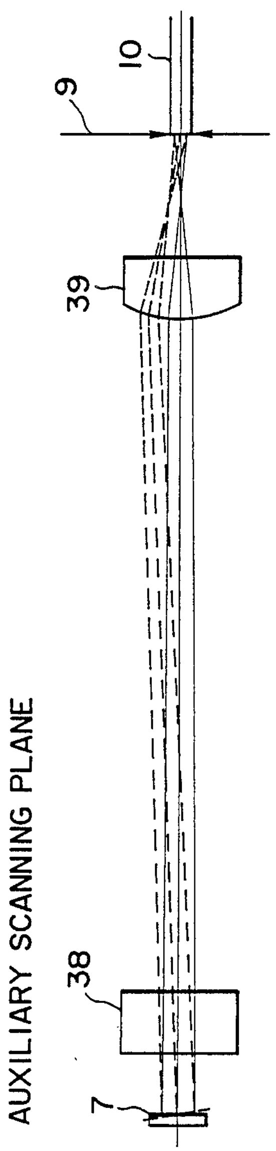

In FIGS. 7A and 7B, two cylindrical lenses are used as the condensing lens and the light beam is individually imaged in the main scanning direction and the auxiliary scanning direction, and only in the auxiliary scanning plane, the return mirror 7 and the end surface of the optical fiber 10 are made optically conjugate with a cylindrical lens 39. Of course, in the main scanning plane also, they may be in optically conjugate relationship.

In the above-described embodiment, a spherical lens or a cylindrical lens has been used as the condensing lens, but it is self-evident that a toric lens may be used instead of a spherical lens or a cylindrical lens to obtain the same effect. Particularly, where the condensing lens is constituted by a single lens, a single lens having an aspherical surface is more preferable than a single lens having a spherical surface, because a single lens having an aspherical surface can better correct the influence of the inclination of the reflecting mirror.

I claim:

1. A laser recording apparatus comprising:

laser generating means for generating a laser beam;

deflecting means for deflecting the laser beam from said laser generating means to apply the laser beam to the surface of a recording medium; and light receiving means for receiving the laser beam deflected by said deflecting means and for obtaining a timing to start modulation of the laser beam to be applied to the surface of the recording medium, said light receiving means including a reflecting member for reflecting the deflected laser beam, a condensing member for condensing the laser beam reflected by said reflecting member, and a light receiving member for receiving the laser beam condensed by said condensing member, said reflecting member and said light receiving member being in optically substantially conjugate relationship with said condensing member in a cross-section perpendicular to a plane in which the laser beam is deflected by said deflecting means, the optical path from said reflecting member to said condensing member being shorter than the imaginary optical path from said reflecting member to the surface of the recording medium.

2. A laser recording apparatus according to claim 1, wherein said condensing member is a single lens having a spherical surface.

3. A laser recording apparatus according to claim 1, wherein said condensing member is a single lens having an aspherical surface.

4. A laser recording apparatus according to claim 1, wherein the point of condensation of the laser beam by said condensing member is between said condensing member and said light receiving member.

5. A laser recording apparatus according to claim 1, wherein said light receiving means further includes a limiting member for limiting the laser beam between said condensing member and said light receiving member.

6. A laser recording apparatus according to claim 5, wherein the position of said limiting member is near the point of condensation of the laser beam by said condensing member.

7. A laser scanning apparatus comprising:

laser generating means for generating a laser beam;

scanning means for scanning the laser beam from said laser generating means to effect scanning on a surface to be scanned with the scanned laser beam;

light receiving means for receiving the laser beam scanned by said scanning means and for obtaining a timing to start modulation of the laser beam to be applied to the surface to be scanned;

a mirror disposed between said scanning means and said light receiving means; and a lens disposed between said mirror and said light receiving means, said mirror and said light receiving means being in optically substantially conjugate relationship with respect to said lens in a cross section perpendicular to a plane in which the laser beam is scanned by said scanning means, and the optical path from said mirror to said lens being shorter than the imaginary optical path from said mirror to the surface to be scanned.

8. A laser scanning apparatus according to claim 7, wherein the point of condensation of the laser beam by said lens is between said lens and said light receiving means.

9. A laser scanning apparatus according to claim 7, further comprising a limiting member disposed between said lens and said light receiving means for limiting the laser beam.

10. A laser scanning apparatus according to claim 9, wherein said limiting means is disposed near the point of condensation of the laser beam by said lens.

11. A laser scanning apparatus comprising:

laser generating means for generating a laser beam;

scanning means for scanning the laser beam from said laser generating means to effect scanning on a surface to be scanned with the scanned laser beam;

light receiving means for receiving the laser beam scanned by said scanning means and for obtaining a timing to start modulation of the laser beam to be applied to the surface to be scanned;

reflecting means disposed between said scanning means and said light receiving means; and optical means disposed between said reflecting means and said light receiving means, said reflecting means and said light receiving means being in optically substantially conjugate relationship with respect to said optical means, and the optical path from said reflecting means to said optical means being shorter than the imaginary optical path from said reflecting means to the surface to be scanned.

* * * * *